Patented Aug. 4, 1953

2,647,900

UNITED STATES PATENT OFFICE 2,647,900

9-(2,3-DIHYDROXYPROPYLAMINOETHYL-AMINO)-ACRIDINES AND THEIR PREPARATION

Alexander R. Surrey and Robert K. Bair, Albany, N. Y., assignors to Sterling Drug Inc., New York, N. Y., a corporation of Delaware No Drawing. Application September 5, 1951, Serial No. 245,252

14 Claims. (Cl. 260—279)

1

This invention relates to 9-(2,3-dihydroxypropylaminoethylamino)-acridines.

These acridine compounds have been found to possess useful chemo-therapeutic properties, especially as anthelmintic agents.

The acridines of the invention have the formula

NHCH$_2$CH$_2$NHCH$_2$CH$_2$OHCH$_2$OH

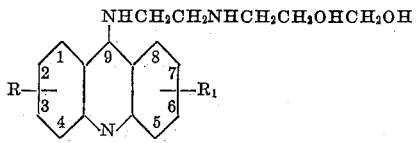

where R is a lower alkoxy radical or hydrogen and R$_1$ is halogen or hydrogen. R, when designating a lower alkoxy radical has preferably one to six carbon atoms, encompassing such radicals as methoxy, ethoxy, n-propoxy, n-butoxy, isobutoxy, 2-butoxy, n-amoxy, n-hexoxy, and the like. R$_1$, when designating halogen, comprehends chloro, bromo, iodo or fluoro.

The compounds having the above formula can be prepared preferably by heating a mixture of phenol and the appropriate 9-haloacridine to form the corresponding 9-phenoxyacridine hydrohalide, which need not be isolated, and then heating the 9-phenoxyacridine hydrohalide with N-(2,3-dihydroxypropyl)ethylenediamine. The 9-chloroacridines are preferably used because of their ready availability and ease of preparation. Illustrative of this preparation is the reaction of 9-chloroacridine with phenol to form 9-phenoxyacridine monohydrochloride which on treatment, in pure or crude form as directly obtained from the reaction mixture of the first step, with N-2, 3-dihydroxypropyl)ethylenediamine yields 9-(2,3-dihydroxpropylaminoethylamino) acridine.

Alternatively, the 9 - (2,3 - dihydroxypropylaminoethylamino) acridines of the invention can be prepared by directly heating the appropriate 9-halo-acridine with N-(2,3-dihydroxypropyl) ethylenediamine, without first reacting the former compound with phenol.

The intermediate N - (2,3 - dihydroxypropyl) ethylenediamine can be prepared by reacting ethylenediamine with either glycidol or glycerol-alphachlorohydrin.

The 9-(2,3-dihydroxypropylaminoethylamino) acridines of the invention are therapeutically active whether employed in the form of their free bases or in the form of their salts with relatively non-toxic organic or inorganic acids. These salts can be prepared by treating the appropriate 9 - (2,3 - dihydroxypropylaminoethylamino) acridine described above with the ap-

2 propriate acid. In practicing the invention, it has been found convenient to isolate the compounds in the form of their hydrochlorides. However, other acid addition salts are within the scope of the invention. Such additional salts include the hydrobromides, hydroiodides, sulfates, phosphates, citrates, sulfamates, tartrates, succinates, acetates, benzoates, oleates, and the like.

The following examples further illustrate specific embodiments of the invention.

EXAMPLE 1

A. *N-(2,3-dihydroxypropyl)ethylenediamine*

This intermediate diamine was prepared by reacting ethylenediamine with either glycidol or glycerol-alpha-chlorohydrin as illustrated in the following paragraphs.

19.5 g. of glycidol (also called epihydrin alcohol, 2,3 - epoxy - 1 - propanol or glycide) was added dropwise with stirring to 100 g. of ethylenediamine at 70–80° C. over a period of ninety minutes. After standing overnight, the excess ethylenediamine was removed by distillation in vacuo and the residue fractionated. There was thus obtained 15 g. of product, B. P. 156° C. at 0.25 micron, which solidified. This solid was recrystallized with difficulty from isopropanol-ether yielding, N - (2,3 - dihydroxypropyl)ethylenediamine, M. P. 57–70° C.

*Anal.*—Calcd. for C$_5$H$_{14}$N$_2$O$_2$: N$_{AP}$, 20.85. Found: N$_{AP}$, 19.74.

N$_{AP}$ stands for basic nitrogen as determined by the method of Toennies and Callan, J. Biol. Chem. 125, 259 (1938).

The picrate was prepared. It melted at 196–198° C. (corr.) with decomposition.

*Anal.*—Calcd. for C$_{17}$H$_{20}$N$_8$O$_{16}$: N$_{AP}$, 4.73. Found: N$_{AP}$, 4.83.

To a stirred solution containing 54 g. of potassium hydroxide and 400 g. of ethylenediamine was added dropwise 110 g. of glycerol-alpha-chlorohydrin (also called 3-chloro-1,2-propanediol) over a period of about ninety minutes. After the addition was completed, the mixture was allowed to stand overnight at room temperature, filtered, and the filtrate then distilled under reduced pressure. After recovering the excess ethylenediamine, the product, N-(2,3-dihydroxypropyl)ethylenediamine, was collected, 65 g. (50%), B. P. 165–170° C. at 0.2 mm. It was found best to distill the product as rapidly as possible. Other samples of this product were collected at 156–158° C. at 0.3 mm. The product solidifies on standing.

In another run, following the procedure described in the immediately preceding paragraph, a yield of 52.7 g. of N-(2,3-dihydroxypropyl)ethylenediamine was obtained when the temperature of the mixture of potassium hydroxide and ethylenediamine was kept at 35–40° C. during the addition of the glycerol-alpha-chlorohydrin.

B. *9-(2,3-dihydroxypropylaminoethylamino)- 2-methoxyacridine dihydrochloride*

A mixture of 17 g. of 9-chloro-2-methoxyacridine and 70 g. of phenol was heated with stirring for fifteen minutes on a steam bath. To the resulting mixture containing 9-phenoxy-2-methoxyacridine hydrochloride was added 13 g. of N-(2,3-dihydroxypropyl)ethylenediamine, and heating and stirring were continued for another two hours. The reaction mixture was poured with stirring into 300 cc. of acetone containing 19 cc. of concentrated hydrochloric acid. The solid which separated was collected, triturated with hot acetone, and recrystallized from 95% ethanol, yielding 20 g. of the product, 9-(2,3-dihydroxypropylaminoethylamino) - 2 - methoxyacridine in the form of its dihydrochloride, M. P. 196.8–202.2° C. (corr.).

*Anal.*—Calcd. for $C_{19}H_{23}N_3O_3 \cdot 2HCl$: Cl, 17.11; N, 10.14. Found: Cl, 17.03; N, 10.02.

N stands for total nitrogen as determined by the Dumas method.

Following the above procedure but without the use of phenol and the fifteen minute heating period, i. e., reaction of 9-chloro-2-methoxyacridine directly with N - (2,3 - dihydroxypropyl)-ethylenediamine, the same product, 9-(2,3-dihydroxypropylaminoethylamino) - 2 - methoxyacridine dihydrochloride, can be obtained.

When the foregoing procedures are followed but using, in place of 9-chloro-2-methoxyacridine, 9-bromoacridine (and concentrated hydrobromic acid in place of the hydrochloric acid), 9-chloro-4-methoxyacridine, 9-chloro-3-ethoxyacridine, 9-chloro - 2 - isobutoxyacridine and 9 - chloro-2-n-hexoxyacridine, there is obtained, respectively, 9-(2,3-dihydroxypropylaminoethylamino)-acridine dihydrobromide, 9-(2,3-dihydroxypropylaminoethylamino) - 4 - methoxyacridine dihydrochloride, 9 - (2,3 - dihydroxyproplyaminoethylamino) - 3 - ethoxyacridine dihydrochloride, 9 - (2,3 - dihydroxypropylaminoethylamino) - 2-isobutoxyacridine dihydrochloride and 9-(2,3-dihydroxyproplyaminoethylamino) - 2 - n - hexoxyacridine dihydrochloride.

EXAMPLE 2

*6-chloro-9-(2,3-dihydroxypropylaminoethylamino)-2-methoxyacridine dihydrochloride*

A mixture of 13.9 g. of 6,9-dichloro-2-methoxyacridine and 45 g. of phenol was heated with stirring on a steam bath for fifteen minutes. To the resulting mixture containing 6-chloro-2-methoxy-9-phenoxyacridine hydrochloride was added 8.4 g. of N-(2,3-dihydroxypropyl)ethylenediamine, and heating and stirring were continued for two hours. The reaction mixture was poured with stirring into 150 cc. of acetone containing 12.5 cc. of concentrated hydrochloric acid. The yellow solid which separated was collected, triturated with hot acetone and recrystallized from water with the addition of some sodium chloride, yielding 12 g. of the prdouct, 6-chloro - 9 - (2,3 - dihydroxypropylaminoethylamino) - 2 - methoxyacridine dihydrochloride, M. P. 207.4–208.4° C. (corr.).

*Anal.*—Calcd. for $C_{19}H_{22}ClN_3O_3 \cdot 2HCl$: Cl, 23.72; N, 9.36. Found: Cl, 23.72; N, 9.30.

Following the above procedure but using, in place of 6,9 - dichloro - 2 - methoxyacridine, 9-chloro - 6 - iodo - 2 - methoxyacridine, 6,9 - dibromo-2-ethoxy-acridine (and concentrated hydrobromic acid in place of the hydrochloric acid), 5,9 - dichloro - 2 - n - propoxyacridine, 4 - n-butoxy - 7,9 - dichloroacridine and 6,9 - dichloro-2-n-hexoxyacridine, there is obtained, respectively, 9 - (2,3 - dihydroxypropylaminoethylamino) - 6 - iodo - 2 - methoxyacridine dihydrochloride, 6 - bromo - 9 - (2,3 - dihydroxyproplyaminoethylamino) - 2 ethoxyacridine dihydrobromide, 5 - chloro - 9 - (2,3 - dihydroxypropylaminoethylamino) - 2 -n - propoxyacridine dihydrochloride, 4 - n - butoxy - 7 - chloro - 9 -(2,3-dihydroxypropylaminoethylamino)acridine dihydrochloride and 6 - chloro - 9 - (2,3-dihydroxypropylaminoethylamino) - 2 - n - hexoxyacridine dihydrochloride.

EXAMPLE 3

*3-chloro-9-(2,3-dihydroxypropylaminoethylamino)acridine dihydrochloride*

A mixture of 27.5 g. of 3,9-dichloroacridine and 75 g. of phenol was heated with stirring on a steam bath for fifteen minutes. To the resulting mixture containing 3-chloro-9-phenoxyacridine hydrochloride was added 13.5 g. of N-(2,3-dihydroxypropyl)ethylenediamine, and heating and stirring were continued for two additional hours. The reaction mixture was poured into 300 cc. of acetone containing 22 cc. of concentrated hydrochloric acid. The product was collected and washed with acetone; the yield was 27.5 g. (M. P. 140–150° C.). One recrystallization from water to which sodium chloride had been added and then from 95% ethanol gave the product, 3 - chloro - 9 - (2,3 - dihydroxypropylaminoethylamino)acridine in the form of its dihydrochloride, melting at 179.7–181.7° C. (corr.).

*Anal.*—Calcd. for $C_{18}H_{20}ClN_3O_2 \cdot 2HCl$: Cl, 25.41; N, 10.04. Found: Cl, 25.22; N, 10.17.

When the above procedure was followed but using, in place of 3,9-dichloroacridine, 2,9-dichloroacridine, 4,9-dichloroacridine, 3,9-dibromoacridine (and concentrated hydrobromic acid in place of the hydrochloric acid) and 9-chloro-3-iodoacridine, there is obtained, respectively, 2-chloro - 9 - (2,3 - dihydroxypropylaminoethylamino)acridine dihydrochloride, 4- chloro 9 - (2,3-dihydroxypropylaminoethylamino)acridine dihydrochloride, 3 - bromo - 9 - (2,3 - dihydroxypropylaminoethylamino)acridine dihydrobromide and 3 - iodo - 9 - (2,3 - dihydroxypropylaminoethylamino)acridine dihydrochloride.

What is claimed is:

1. A 9 - (2,3 - dihydroxypropylaminoethylamino)acridine having the formula

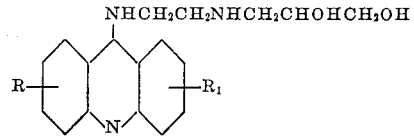

where R is a member of the group consisting of hydrogen and a lower alkoxy radical and R1 is a member of the group consisting of hydrogen and halogen.

2. A 2-alkoxy-6-halo-9-(2,3 - dihydroxypropyl-aminoethylamino) acridine having the formula

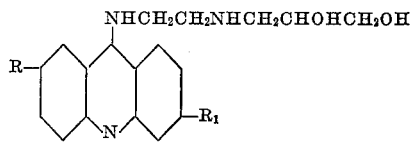

where R is a lower alkoxy radical and R₁ is halogen.

3. A 2-alkoxy - 9 - (2,3-dihydroxypropylaminoethylamino) acridine having the formula

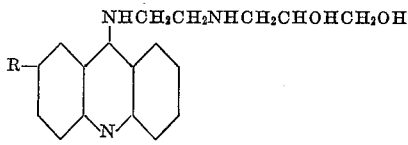

where R is a lower alkoxy radical.

4. A 3-halo-9-(2,3-dihydroxypropylaminoethylamino) acridine having the formula

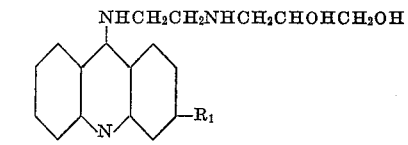

where R₁ is halogen.

5. 9-(2,3 - dihydroxypropylaminoethylamino)-2-methoxyacridine.

6. 6-chloro-9-(2,3 - dihydroxypropylaminoethylamino)-2-methoxyacridine.

7. 3-chloro-9-(2,3 - dihydroxypropylaminoethyl) acridine.

8. In the process of preparing a 9-(2,3-dihydroxypropylaminoethylamino) acridine having the formula

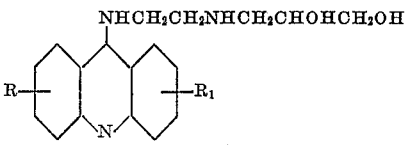

where R is a member of the group consisting of hydrogen and a lower alkoxy radical and R₁ is a member of the group consisting of hydrogen and halogen, the step which comprises heating a member of the group consisting of the corresponding 9-haloacridine and 9-phenoxyacridine hydrohalide with N-(2,3-dihydroxypropyl) ethylenediamine.

9. In the process of preparing a 2-alkoxy-6-halo-9-(2,3 - dihydroxypropylaminoethylamino) - acridine having the formula

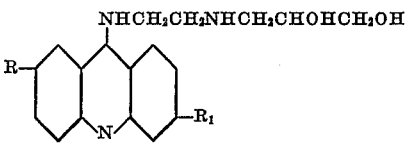

where R is a lower alkoxy radical and R₁ is halogen, the step which comprises heating the corresponding 2 - alkoxy-6-halo-9-phenoxyacridine monohydrochloride with N - (2,3 - dihydroxypropyl) ethylenediamine.

10. In the process of preparing a 2-alkoxy-9-(2,3 - dihydroxypropylaminoethylamino) acridine having the formula

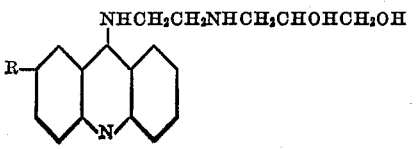

where R is a lower alkoxy radical, the step which comprises heating the corresponding 2-alkoxy-9-phenoxyacridine hydrochloride with N-(2,3-dihydroxypropyl) ethylenediamine.

11. In the process of preparing a 3-halo-9-(2,3 - dihydroxypropylaminoethylamino) acridine having the formula

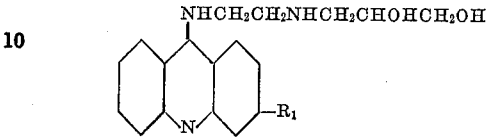

where R₁ is halogen, the step which comprises heating a 3-halo-9-phenoxyacridine hydrochloride with N-(2,3-dihydroxypropyl) ethylenediamine.

12. In the process of preparing 9-(2,3-dihydroxypropylaminoethylamino - 2 - methoxyacridine having the formula

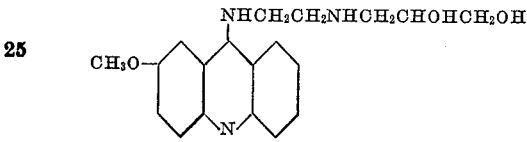

the step which comprises heating 2-methoxy-9-phenoxyacridine hydrochloride with N-(2,3-dihydroxypropyl) ethylenediamine.

13. In the process of preparing 6-chloro-9-(2,3-dihydroxypropylaminoethylamino)-2-methoxyacridine having the formula

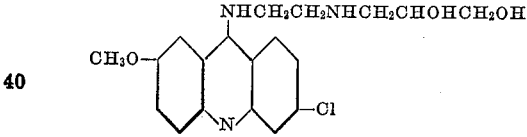

the step which comprises heating 6-chloro-2-methoxy-9-phenoxyacridine hydrochloride with N-(2,3-dihydroxypropyl) ethylenediamine.

14. In the process of preparing 3-chloro-9-(2,3-dihydroxypropylaminoethylamino) acridine having the formula

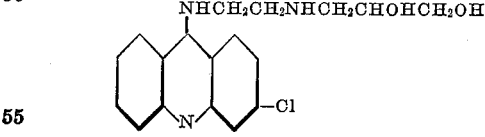

the step which comprises heating 3-chloro-9-phenoxyacridine hydrochloride with N-(2,3-dihydroxypropyl) ethylenediamine.

ALEXANDER R. SURREY.
ROBERT K. BAIR.

References Cited in the file of this patent

UNITED STATES PATENTS

| Number | Name | Date |
| --- | --- | --- |
| 2,531,010 | Surrey | Nov. 21, 1950 |
| 2,531,011 | Surrey | Nov. 21, 1950 |
| 2,531,012 | Surrey | Nov. 21, 1950 |

OTHER REFERENCES

McChesney et al., Proc. Soc. Exptl. Bial. Med., vol. 72, pp 378-379 (1949).